United States Patent
Ishizaki et al.

(10) Patent No.: US 6,500,519 B2
(45) Date of Patent: Dec. 31, 2002

(54) OXYGEN ABSORBABLE LAMINATE AND PRODUCTION METHOD THEREOF

(75) Inventors: Youichi Ishizaki, Yokohama (JP); Kentaro Ichikawa, Yokohama (JP); Hidehiko Nishizuka, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 46 days.

(21) Appl. No.: 09/880,790

(22) Filed: Jun. 15, 2001

(65) Prior Publication Data

US 2002/0012808 A1 Jan. 31, 2002

(30) Foreign Application Priority Data

Jun. 19, 2000 (JP) .......................... 2000-182561
Jul. 19, 2000 (JP) .......................... 2000-219150

(51) Int. Cl.[7] .............. B32B 27/32; A23L 3/00
(52) U.S. Cl. ............. 428/141; 427/177; 427/444; 428/35.3; 428/35.4; 428/35.8; 428/35.9; 428/36.7; 428/328; 428/330; 428/515; 428/516

(58) Field of Search ................. 428/328, 330, 428/515, 516, 906, 141, 35.3, 35.4, 35.8, 35.9, 36.6, 36.7; 427/177, 444

(56) References Cited

U.S. PATENT DOCUMENTS 5,889,093 A * 3/1999 Hatakeyama et al. .. 252/188.28

FOREIGN PATENT DOCUMENTS

| JP | 9-51786 | 2/1997 |
| JP | 11-151783 | 6/1999 |

* cited by examiner

*Primary Examiner*—D. S. Nakarani
(74) *Attorney, Agent, or Firm*—Kanesaka & Takeuchi (57) ABSTRACT

There are provided an oxygen absorbable laminate comprising an internal layer, an oxygen absorbable layer and an external layer, in which at least one surface of the oxygen absorbable laminate is roughened and subjected to a water incorporation treatment; and a production method thereof. The oxygen absorbable laminate can effectively exert oxygen absorbability even when used for dried foods and the like.

13 Claims, 3 Drawing Sheets

OXYGEN ABSORBABLE LAMINATE AND PRODUCTION METHOD THEREOF

BACKGROUND OF THE INVENTION

1. Field of the Invention

The present invention relates to an oxygen absorbable laminate and a production method thereof. More specifically, it relates to an oxygen absorbable laminate which can effectively exert oxygen absorbability even when used in dried foods and the like; and a production method thereof.

2. Description of the Related Art

Heretofore, in order to prevent a degradation in the quality of foods and the like, there are known packaging containers such as packaging bags comprising a laminate film having resin layers to which an oxygen absorber utilizing an oxidation-reduction reaction has been added.

However, when such packaging bags are simply used for packaging dried foods and the like, it is difficult to supply, from the outside of the bags, water necessary to cause an oxidation-reduction reaction to exert oxygen absorbability. As a result, the oxygen absorbability is not effectively exerted.

Japanese Patent Application Laid-Open No. 051786/1997 discloses a packaging material for dried foods which is obtained by bringing a metal iron powder-containing sheet material into contact with water and allowing the resulting material to cure in a sealed system, and a production method thereof comprising winding up the metal iron powder-containing sheet material into the form of a coil after the contact with water, welding-sealing the coil-like material by using a material having oxygen barrier properties and allowing the material to cure.

Further, Japanese Patent Application Laid-Open No. 151783/1999 discloses a laminate for packaging which is obtained by preparing a laminate which comprises an external layer comprising continuous layers of a thermoplastic resin, an oxygen-barrierable intermediate layer, an oxygen absorbable intermediate layer and an internal layer comprising continuous layers of a moisture-resistant thermoplastic resin, winding up the laminate on a roll with 0.2 to 25 g/m² of water uniformly present on its surface and allowing the rolled laminate to age in an oxygen-blocking atmosphere.

Further, Japanese Patent Application Publication No. 21083/1995 discloses a film product comprising an oxygen absorbable resin composition to which a hydrophilic filler has been added in order to supply a required amount of water.

More specifically, the film product is obtained by melting an oxygen absorbable resin composition to which 50 to 400 parts by weight of fine iron powders of at least 100 meshes, at least 2 parts by weight of sodium chloride fine powders of at least 100 meshes and at least 5 parts by weight of hydrophilic filler based on 100 parts by weight of a thermoplastic resin have been added to form the composition into a film, immersing the film in a water bath or humidified bath at room or elevated temperatures, removing water from the film and drying the film.

However, since the conventionally known oxygen absorbable film product has a smooth surface, it is difficult for the product to contain water in the amount required to exert oxygen absorbability effectively in a series of water incorporation treatments comprising applying water to the film, winding it up into a roll form and allowing the wound roll to age.

Further, when the conventional water-absorbed oxygen absorbable film product is simply used under low-moisture atmosphere, it fails to fully exert the oxygen absorbability for preventing a degradation in the quality of foods and the like, and this is particularly noticeable when the film product is used for packaging dried foods.

SUMMARY OF THE INVENTION

It is an object of the present invention to provide an oxygen absorbable laminate which can effectively exert oxygen absorbability even when used in dried foods and the like for which oxygen absorbability is not effectively obtained, and a production method thereof.

The present inventors have made intense studies on the problems and found that there is a correlation between the surface roughness of a surface of the oxygen absorbable laminate and the water content of the laminate after the water-applied laminate is rolled up and allowed to age and that the water content can be increased qualitatively and significantly by roughening at least one surface of the laminate.

Further, they have also found that in the case of an oxygen absorbable laminate in which the resins constituting an internal layer and an oxygen absorbable layer are ethylene resins, by making the resin density of the internal layer higher than the resin density of the oxygen absorbable layer, the laminate can exhibit stable oxygen absorbability even under low-moisture atmosphere.

According to the present invention, there is provided an oxygen absorbable laminate comprising an internal layer, an oxygen absorbable layer and an external layer, in which at least one surface of the oxygen absorbable laminate is roughened and subjected to a water incorporation treatment. As a result, water is retained in the oxygen absorbable layer, and the above problem can be solved.

That is, by roughening one or both surfaces of the oxygen absorbable laminate, the water content when water is applied to the laminate and the resulting laminate is rolled up and allowed to age is increased effectively. Consequently, the laminate can effectively exert oxygen absorbability even when used for dried foods and the like.

However, the present invention can also apply to any materials other than dried foods.

Further, the roughened surface preferably has an arithmetic average roughness (Ra) (in accordance with JIS B0601) of 0.4 to 20 μm.

By having such roughness, the water content when water is applied to the laminate and the resulting laminate is rolled up and allowed to age is increased securely and quantitatively. Therefore, the laminate can effectively exert excellent oxygen absorbability over a long time period even when used for dried foods and the like.

Further, in the oxygen absorbable laminate of the present invention, the water content is preferably 0.5 to 25 g/m² after water is applied to the laminate and the resulting laminate is rolled up and allowed to age.

Due to such water content, the laminate can quantitatively exert oxygen absorbability even when used for dried foods and the like.

The water content is specifically defined by the following expression (1).

$$W1 = (W2 - W3)/A \quad (1)$$

W1: water content (g/m$^2$)
W2: weight (g) of oxygen absorbable laminate after aging
W3: weight (g) of oxygen absorbable laminate after drying (temperature: 70° C., pressure: 1×10$^{-3}$ Pa or lower, time: 24 hours)
A: area (m$^2$) of oxygen absorbable laminate Further, in order to form the roughened surface, inorganic particles and organic particles, or either of these particles are preferably added to at least one of the internal layer, oxygen absorbable layer and external layer.

By adding such particles, a surface with the controlled roughness is formed easily and securely on a surface of the internal layer and/or a surface of the external layer, thereby increasing the water content of the oxygen absorbable laminate securely.

Further, a flattening layer is preferably provided between the oxygen absorbable layer and the external layer.

By providing the flattening layer, even when pits and projections are formed on a surface of the oxygen absorbable layer by the oxygen absorber particles contained therein or when the oxygen absorber particles are present on the surface of the oxygen absorbable layer, the flattening layer absorbs these particles, thereby not only preventing deterioration of the outer appearance but also facilitating the bonding between the oxygen absorbable layer and the external layer.

In the oxygen absorbable laminate of the present invention, the internal layer and the oxygen absorbable layer preferably comprise ethylene resins and the relationship between the resin density (d1) of the internal layer and the resin density (d2) of the oxygen absorbable layer is preferably d1>d2.

By making the internal layer and oxygen absorbable layer of ethylene resins as constituents of the oxygen absorbable laminate and having the relationship d1>d2 between the resin density (d1) of the internal layer and the resin density (d2) of the oxygen absorbable layer, the moisture retainability can be improved by preventing water entered the oxygen absorbable layer from dissipating to the outside of the layer and the permeability of oxygen to the above oxygen absorbable layer via the internal layer can be improved. This oxygen absorbable laminate can then exert more excellent oxygen absorbability.

In addition, in the oxygen absorbable laminate of the present invention, the density (d1) of the ethylene resin constituting the internal layer is preferably 0.915 g/cm$^3$ to 0.950 g/cm$^3$. This resin density allows more remarkable improvement in the above properties.

Further, in the oxygen absorbable laminate of the present invention, a water-vapor permeability coefficient (H1) of the ethylene resin constituting the oxygen absorbable layer is preferably higher than or equal to a water-vapor permeability coefficient (H2) of the ethylene resin constituting the internal layer.

By satisfying such a relationship between the water-vapor permeability coefficients, water entered the oxygen absorbable layer is blocked by the internal layer, thereby preventing the dissipation of water from the oxygen absorbable layer to the outside thereof more effectively.

Further, in the oxygen absorbable laminate of the present invention, an oxygen permeability coefficient (O1) of the ethylene resin constituting the oxygen absorbable layer is preferably higher than or equal to an oxygen permeability coefficient (O2) of the ethylene resin constituting the internal layer.

By satisfying such a relationship between the oxygen permeability coefficients, oxygen reaches the inside of the oxygen absorbable layer effectively, thereby exerting excellent oxygen absorbability.

Further, according to the present invention, there is provided a production method of an oxygen absorbable laminate comprising an internal layer, an oxygen absorbable layer and an external layer, comprising the steps of:
  roughening at least one surface of the oxygen absorbable laminate,
  applying water to the above oxygen absorbable laminate,
  winding up the above water-applied oxygen absorbable laminate into a roll form, and
  allowing the above water-applied rolled oxygen absorbable laminate to age.

The method allows easy production of the oxygen absorbable laminate which has good moisture retainability in the oxygen absorbable layer and effectively exerts oxygen absorbability even when used for packages of dried foods and the like.

Further, when the production method of the oxygen absorbable laminate of the present invention is carried out, water is preferably applied to the oxygen absorbable laminate after the laminate is cured.

By producing the oxygen absorbable laminate in such a manner, the peeling of the oxygen absorbable laminate is securely prevented when water is applied to the surface of the laminate.

Further, when the production method of the oxygen absorbable laminate of the present invention is carried out, the roughened surface preferably has an arithmetic average roughness (Ra) (in accordance with JIS B0601) of 0.4 to 20 µm.

By producing the oxygen absorbable laminate in such a manner, the water content is increased securely and quantitatively after water is applied to the laminate and the laminate is allowed to age. Therefore, the laminate can effectively exert excellent oxygen absorbability over a long time period even when used for dried foods and the like.

Further, when the production method of the oxygen absorbable laminate of the present invention is carried out, inorganic particles and organic particles or either of these particles are preferably added to at least one of the internal layer, oxygen absorbable layer and external layer to roughen a surface of the above oxygen absorbable laminate.

By adding such particles, the surface of the oxygen absorbable laminate can be roughened easily without subjecting the surface to a mechanical treatment and the like.

BEST MODE FOR CARRYING OUT THE PRESENT INVENTION

The oxygen absorbable laminate of the present invention and the production method thereof will be described in detail with reference to drawings hereinafter.

Figure 1:
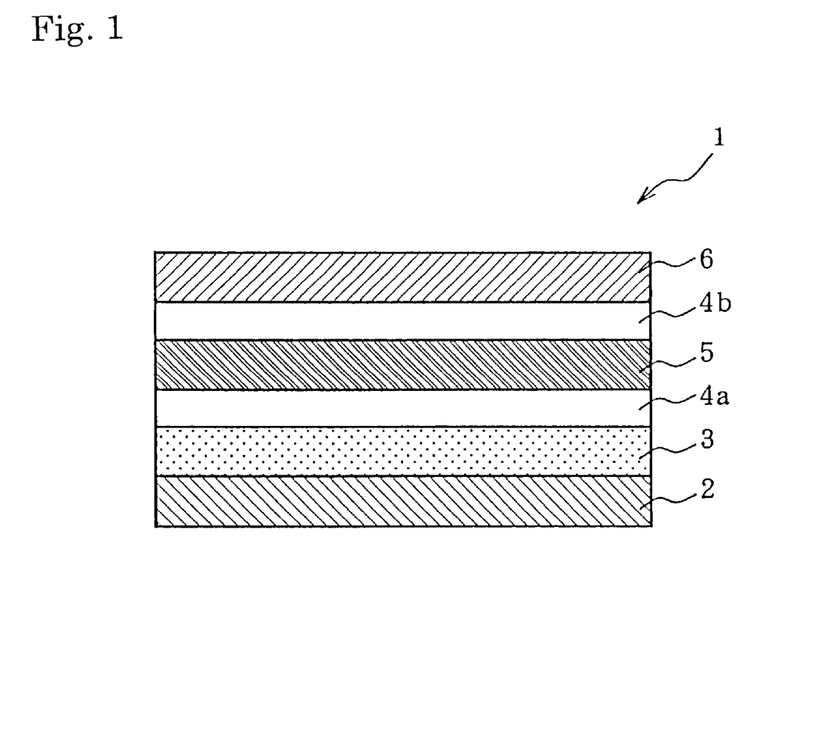
FIG. 1 is a sectional view of one embodiment of the oxygen absorbable laminate according to the present invention.

FIG. 1 is a sectional view of one embodiment of the oxygen absorbable laminate according to the present invention.

This oxygen absorbable laminate 1 comprises an internal layer (concealed layer) 2, an oxygen absorbable layer 3, a first adhesive resin layer 4a, a gas barrier layer 5, a second adhesive resin layer 4b, and an external layer (protective layer) 6.

In this embodiment, the oxygen absorbable laminate 1 is an oxygen absorbable laminate in which one or both of the internal layer 2 and the external layer 6 have a rough surface.

Figure 2:
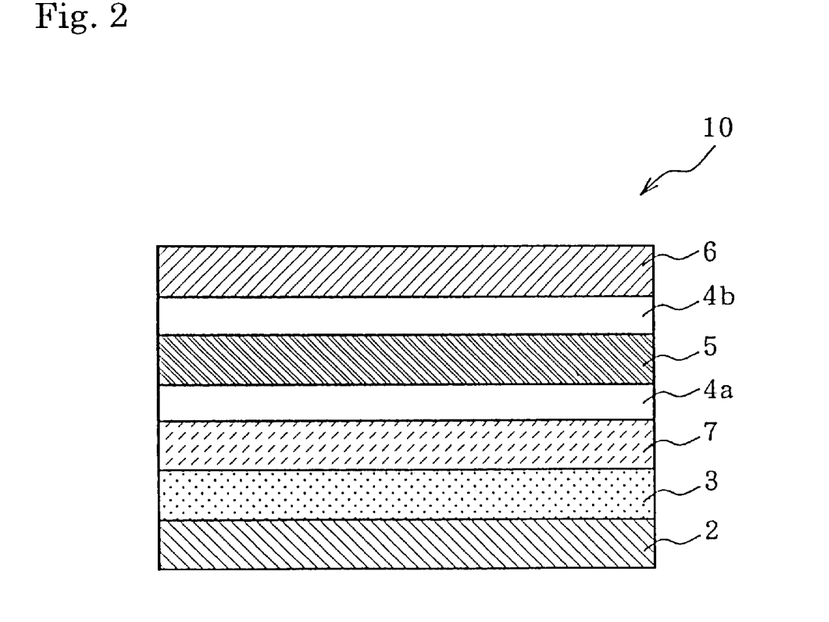
FIG. 2 is a sectional view of another embodiment of the oxygen absorbable laminate according to the present invention.

In this case, a resin layer other than the first adhesive resin layer 4a, particularly a flattening layer (shock-absorbing layer) which is the same type of layer as the internal layer or the oxygen absorbable layer may be provided between the oxygen absorbable layer 3 and the gas barrier layer 5. FIG. 2 is a schematic view of the oxygen absorbable laminate having the flattening layer.

FIG. 2 is a sectional view of another embodiment of the oxygen absorbable laminate according to the present invention.

This oxygen absorbable laminate 10 comprises an internal layer 2, an oxygen absorbable layer 3, a flattening layer 7, a first adhesive resin layer 4a, a gas barrier layer 5, a second adhesive resin layer 4b, and an external layer 6. The oxygen absorbable laminate 10 is an oxygen absorbable laminate in which one or both of the internal layer 2 and the external layer 6 have a rough surface.

For the oxygen absorbable laminate 10, since the oxygen absorbable layer 3 containing an oxygen absorber, the internal layer 2 and the flattening layer 7 are coextruded with the layer 3 sandwiched between the layer 2 and the layer 7 to be firmly integrated, the exposure of the oxygen absorber is prevented in spite of the volume expansion caused by oxidation of the oxygen absorber. Therefore, it has excellent appearance, adhesive properties and flavor retainability.

A description will be given to each layer of the oxygen absorbable laminate hereinafter.

[Internal layer]

As the internal layer of the oxygen absorbable laminate, a thermoplastic resin having heat sealability and excellent moisture resistance is preferably used.

Illustrative examples of the resin constituting the internal layer include olefin resins such as low-density polyethylenes (LDPE), medium-density polyethylenes, high-density polyethylenes, linear low-density polyethylenes (LLDPE), very low-density polyethylenes, polypropylenes, ethylene-propylene copolymers, ethylene-á-olefin copolymers, poly(1-butene), poly(4-methyl-1-pentene), ethylene-vinyl acetate copolymers (EVA), ethylene-ethyl acrylate copolymers (EEA), ion crosslinked olefin copolymers (ionomers) and acid denatured olefin resins. These can be used solely or in admixture of two or more.

Among the above resins, ethylene resins such as low-density polyethylenes (LDPE), medium-density polyethylenes, high-density polyethylenes, linear low-density polyethylenes (LLDPE), very low-density polyethylenes, ethylene-propylene copolymers, ethylene-á-olefin copolymers and the like are preferable.

Further, a concealing agent such as white pigment, e.g., titanium dioxide, is preferably added to the above internal layer for the purpose of concealing the coloration caused by the oxygen absorber in the oxygen absorbable layer.

Further, the amount of the concealing agent is preferably 1 to 20 parts by weight based on 100 parts by weight of the resin constituting the internal layer.

This is because concealability lowers when the amount of the concealing agent is smaller than 1 part by weight, while it is difficult to disperse the concealing agent uniformly when the amount of the concealing agent is larger than 20 parts by weight.

The thickness of the internal layer is preferably 5 to 250 $\mu$m because when the thickness is smaller than 5 $\mu$m, oxygen absorbability is deactivated as an early stage and heat sealability also lowers, while the thickness is larger than 250 $\mu$m, the oxygen absorbability and the heat sealability lower. The thickness of the internal layer is more preferably 10 to 100 $\mu$m, much more preferably 15 to 50 $\mu$m.

[Oxygen absorbable layer]

The oxygen absorbable layer used in the oxygen absorbable laminate is made of a thermoplastic resin containing an oxygen absorber made of metal powders such as iron powders, aluminum powders and the like and salts. The metal powders are preferably reduced iron powders from the viewpoint of reactivity with oxygen in particular. In this case, the particle diameters of the reduced iron powders are preferably 1 to 100 $\mu$m, and the shapes thereof are flat, spherical and the like, and a flat shape is preferable particularly from the viewpoint of the adhesion between the oxygen absorbable layer and the layers adjacent to it. The salts used in the present invention are generally water-soluble, and metal halides are suitably used particularly from the viewpoint of the acceleration of the oxidation of the reduced iron powders.

Illustrative examples of the thermoplastic resin used in the oxygen absorbable layer include olefin resins such as low-density polyethylenes (LDPE), linear low-density polyethylenes (LLDPE), very low-density polyethylenes, medeium density polyethylenes high-density polyethylenes, polypropylenes, ethylene-propylene copolymers, ethylene-á-olefin copolymers, poly(1-butene), poly(4-methyl-1-pentene), ethylene-vinyl acetate copolymers (EVA), ethylene-ethyl acrylate copolymers (EEA), ion crosslinked olefin copolymers (ionomers) and acid denatured olefin resins; thermoplastic elastomers such as ethylene-propylene rubber (EPR) and ethylene-propylene-diene rubber (EPDM); and mixtures thereof.

Among the above resins, ethylene resins such as low-density polyethylenes (LDPE), medium-density polyethylenes, high-density polyethylenes, linear low-density polyethylenes (LLDPE), very low-density polyethylenes, ethylene-propylene copolymers, ethylene-á-olefin copolymers and the like are preferable because they absorb oxygen quickly and have excellent oxygen permeability.

Further, although the olefin resins are resins with little moisture retainability, the water required for oxygen absorption can be smoothly replenished by the coexistence with the salts.

The oxygen absorbable resin composition constituting the oxygen absorbable layer preferably contains 1 to 200 parts by weight of the oxygen absorber based on 100 parts by weight of the thermoplastic resin.

This is because when the contents of the oxygen absorber are lower than the above ranges, oxygen absorbability may lower, while when the contents of the oxygen absorber are higher than the above ranges, the formability of the oxygen absorbable resin composition may lower.

Therefore, the oxygen absorbable resin composition more preferably contains 5 to 100 parts by weight of the oxygen absorber based on 100 parts by weight of the thermoplastic resin.

In the present invention, the mixing ratio (weight ratio) of the reduced iron powders and the salts is preferably 100:0.1 to 100:30, more preferably 100:1 to 100:10.

This is because when the mixing ratio of the reduced iron powders and the salts is within the above range, not only an excellent oxygen absorption rate but also excellent water resistance and mechanical properties can be obtained.

Although the thickness of the oxygen absorbable layer varies depending on the absorbed amount of oxygen and forming shape required for the oxygen absorbable laminate, it is preferably 10 to 200 μm, more preferably 15 to 150 μm, much more preferably 20 to 100 μm.

This is because when the thickness of the oxygen absorbable layer is smaller than 10 μm, the relative amount of oxygen absorber decreases, thereby making it difficult to maintain the oxygen absorbability over a long time period in some cases, while when the thickness is larger than 200 μm, the oxygen absorbable layer sticks out of the oxygen absorbable laminate at the time of heat-sealing, thereby degrading the appearance of the laminate.

[Gas barrier layer]

The oxygen absorbable laminate may contain a gas barrier layer. The gas barrier layer is not limited to certain layers. Generally used materials such as metal leaves, gas-barrierable resins or inorganic deposited resin films and the like can be used as a gas barrier layer.

Illustrative examples of the metal leaves include leaves light metals such as aluminum and aluminum alloys, iron leaf, tin plate leaf, and steel leaves such as surface-treated steel leaves.

The gas-barrierable resins preferably have a low oxygen permeability coefficient.

Illustrative examples of such gas-barrierable resins include an ethylene-vinyl alcohol copolymer and polyamides.

Further, illustrative examples of the inorganic deposited resin films include resin films on which silica, alumina or the like is deposited. When the inorganic deposited resin film is used, the laminate is formed such that the deposited side of the film faces inward. That is, the deposited layer acts as a barrier layer, and the resin film layer acts as an external layer to be described later.

[External layer]

As the external layer of the oxygen absorbable laminate, any layer comprising continuous layers (non-permeable resin layers) of a thermoplastic resin can be used.

Illustrative examples of the resin constituting this external layer include polyolefins such as low-density polyethylenes, high-density polyethylenes and polypropylenes; polyamides such as nylon 6; and polyesters such as polyethylene terephthalate.

In general, it is suitable to use, as the thermoplastic resin for the external layer, a thermoplastic resin which has excellent strength, thrust resistance and heat resistance as compared with the resin for the internal layer. Thus, monoaxially or biaxially stretched films such as olefin resins, nylon resins and polyester resins are suitably used.

[Flattening layer]

When the gas barrier layer is laminated on the oxygen absorbable layer, since pits and projections are formed on the surface of the oxygen absorbable layer by the oxygen absorber particles, the laminate may have poor adhesion and/or poor appearance in some cases. To prevent this, the flattening layer is preferably interposed between the layers.

As such flattened resins, the same resins as those used in the above oxygen absorbable layer may be used.

For example, the internal layer, the oxygen absorbable layer and the flattening layer may comprise ethylene resins.

Further, the thickness of the flattening layer is preferably 2 to 100 μm. When it is smaller than 2 μm, it is difficult to absorb the pits and projections formed on the surface of the oxygen absorbable layer by the flattening layer, while when it is larger than 100 μm, the flattening layer sticks out of the laminate at the time of heat sealing, thereby degrading the appearance of the laminate.

Therefore, the thickness of the flattening layer is more preferably 3 to 50 μm, much more preferably 5 to 25 μm.

When a resin film comprising a transparent or translucent ethylene-vinyl alcohol copolymer, polyamide or the like or a resin film on which silica or the like is deposited is used as the above gas barrier layer, a concealing agent such as white pigment, e.g., titanium dioxide, is preferably added to the above flattening layer, as in the case of the internal layer, for the purpose of concealing the coloration caused by the oxygen absorber in the oxygen absorbable layer.

[Surface roughness]

Further, the arithmetic average roughness (Ra) (in accordance with JIS B0601) of the surface of the oxygen absorbable laminate is preferably 0.4 to 20 μm.

This is because when the arithmetic average roughness of the surface of the internal layer or the external layer is smaller than 0.4 μm, the laminate cannot retain water sufficiently when rolled up and the water content therefore decreases, so that when it is used for dried foods, it hardly exerts oxygen absorbability effectively in some cases, while when the arithmetic average roughness of the surface of the internal layer is larger than 20 μm, it is difficult to form and control the uniformly roughened surface, and heat sealability also lowers.

As for the external layer, an arithmetic average roughness of larger than 20 μm causes poor appearance.

Therefore, the arithmetic average roughness (Ra) of the roughened surface formed on the surface of the internal layer is more preferably 0.5 to 10 μm, much more preferably 0.6 to 5 μm, since the balance between oxygen absorbability and the ease of production of the laminate further improves.

Further, in the oxygen absorbable laminate of the present invention, the water content defined as expression (1) described above is preferably 0.5 to 25 g/m$^2$. When the water content is lower than 0.5 g/m$^2$, oxygen absorbability may deteriorate significantly, while when it is higher than 25 g/m$^2$, heat sealability may deteriorate.

By having such a constitution, the oxygen absorbability and moisture retainability of the oxygen absorbable layer in the oxygen absorbable laminate are improved securely. Thereby, the oxygen absorbable laminate can effectively exert excellent oxygen absorbability even when used for dried foods and the like. The effect of the arithmetic average roughness (Ra) of the roughened surface formed on the surface of the internal layer will be described in more detail with reference to FIGS. 3 and 4 hereinafter.

Figure 3:
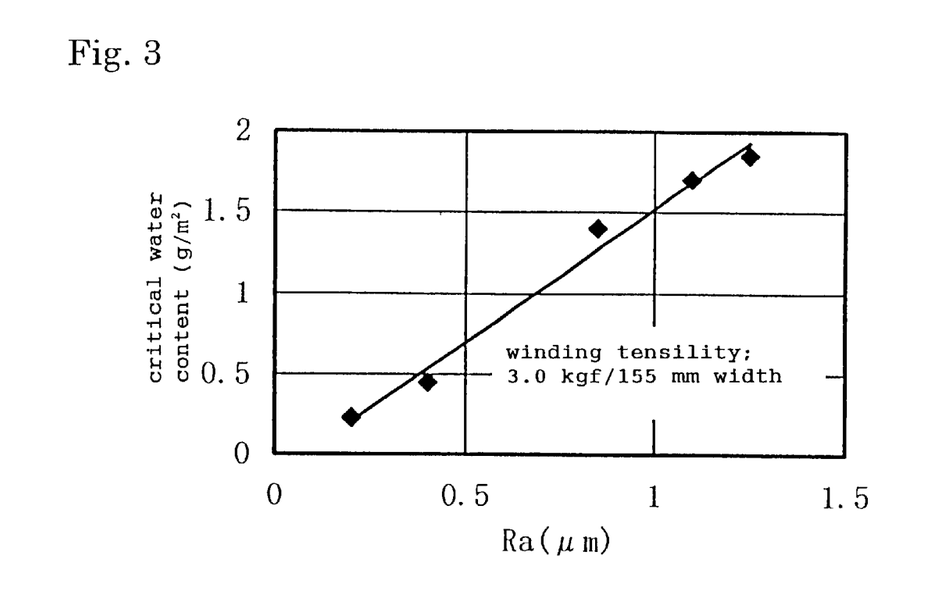
FIG. 3 is a diagram showing the relationship between surface roughness (Ra) and critical amount of applied water.

FIG. 3 is a diagram showing the relationship between the arithmetic average roughness (Ra) and a critical water content. The horizontal axis represents the arithmetic average roughness (Ra), and the vertical axis represents the critical water content (g/m$^2$).

The "critical water content" is the critical (maximum) amount of water which can be contained in the oxygen absorbable laminate by the method comprising the steps of applying water to the oxygen absorbable laminate, winding it up into a roll form, sealing the roll by packaging materials or the like and allowing the roll to age.

As is easily understood from FIG. 3, the arithmetic average roughness (Ra) and the critical water content are almost in a proportional relationship. Therefore, for example, by setting the arithmetic average roughness to be a value of not smaller than 0.5 μm, a value of not lower than 0.7 g/m$^2$ can be obtained as the critical water content.

Figure 4:
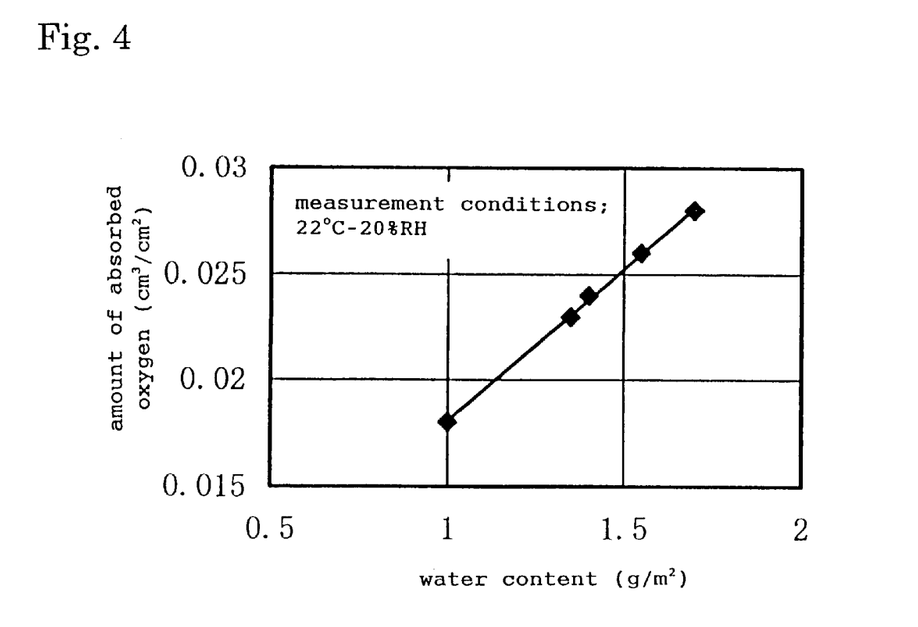
FIG. 4 is a diagram showing the relationship between the amount of applied water and amount of absorbed oxygen.

Meanwhile, FIG. 4 is a diagram showing the relationship between the water content and the amount of absorbed oxygen under dry conditions. The horizontal axis represents the water content (g/m²), and the vertical axis represents the amount of absorbed oxygen (cm³/cm²).

The terms "amount of absorbed oxygen" as used herein mean the amount of oxygen which can be absorbed per unit area under the dry conditions of 22° C. and 20%RH by the oxygen absorbable laminate. It is calculated from the amount of absorbed oxygen totaled until the oxygen absorbability becomes ineffective.

As is easily understood from FIG. 4, the water content and the amount of absorbed oxygen are almost in a proportional relationship. Therefore, for example, by setting the water content to be a value of not lower than 1 g/m², a value of not smaller than 0.017 cm³/cm² can be obtained as the amount of absorbed oxygen.

[Roughening of surface]

(a) Inorganic particles and organic particles

To roughen the surface of the oxygen absorbable laminate of the present invention and cause it to have a given surface roughness (Ra) to be described later, it is particularly preferable to add inorganic particles and organic particles or either of these particles to the internal layer, the oxygen absorbable layer or the external layer and secure the particles after extrusion.

The addition of these particles makes the surface of the oxygen absorbable laminate a rough surface which is ascribable to the sizes and amounts of the particles added to the internal layer, the oxygen absorbable layer or the external layer.

The blending of the inorganic particles and/or the organic particles with the resin matrix may be carried out by dry blending or melt blending. In general, it is preferable to produce a master batch containing inorganic particles and/or organic particles in high concentrations and dilute the resin matrix with the above master batch to a predetermined amount of the particles.

The types of such inorganic particles and organic particles are not particularly limited. Illustrative examples of these particles include carbon black, white carbon, talc, clay, mica, calcium silicate, zeolite, diatomaceous earth, silica sand, synthetic silica, alumina hydrate, calcium carbonate, calcium sulfate, aluminum oxide, metal powders, glass powders, PMMA particles and St particles. They can be used solely or in combination of two or more.

When these inorganic particles and organic particles or either of these particles are to be contained in the internal layer, the average particle diameter (agglomerate diameter when the particles are agglomerated) of the particles is preferably 1 to 100 μm.

This is because when the average particle diameter of the particles is smaller than 1 μm, it is difficult to roughen the surface of the internal layer, while when it is larger than 100 μm, heat sealability deteriorates and/or it is difficult to secure the particles in the internal layer.

Therefore, to further improve the balance between the formability of the roughened surface and securing of the particles in the internal layer, the average particle diameter of the particles is more preferably 3 to 50 μm, much more preferably 5 to 30 μm.

The amount of the inorganic particles and organic particles is preferably 0.1 to 20 parts by weight, more preferably 3 to 15 parts by weight, based on 100 parts by weight of the resin constituting the internal layer.

This is because when the amount of the particles is smaller than 0.1 parts by weight, it is difficult to roughen the surface of the internal layer, while when it is larger than 20 parts by weight, heat sealability deteriorates and/or it is difficult to secure the particles in the internal layer.

Further, when these inorganic particles and organic particles or either of these particles are to be contained in the oxygen absorbable layer, the average particle diameter (agglomerate diameter when the particles are agglomerated) of the particles is preferably 1 to 100 μm.

This is because when the average particle diameter of the particles is smaller than 1 μm, it is difficult to roughen the surface of the oxygen absorbable laminate, while when it is larger than 100 μm, the adhesion between the oxygen absorbable layer and the layers adjacent to it deteriorates, and the heat sealability of the internal layer also deteriorates.

Therefore, to further improve the balance between the formability of the roughened surface on the surface(s) of the internal layer and/or the external layer and the adhesion between the oxygen absorbable layer and the two layers adjacent to it, the average particle diameter of the particles is more preferably 5 to 80 μm, much more preferably 10 to 60 μm.

In this case, the roughened surface formed on the surface of the oxygen absorbable layer is also formed on the surface(s) of the internal layer and/or the external layer via its adjacent layers.

The amount of the inorganic particles and organic particles is preferably 1 to 30 parts by weight based on 100 parts by weight of the resin constituting the oxygen absorbable layer.

This is because when the amount of the particles is smaller than 1 part by weight, it is difficult to roughen the surface of the oxygen absorbable laminate, while when it is larger than 30 parts by weight, the adhesion between the oxygen absorbable layer and the layers adjacent to it deteriorates, and the heat sealability of the internal layer also deteriorates.

Therefore, to further improve the balance between the formability of the roughened surface on the surface(s) of the internal layer and/or the external layer and the adhesion between the oxygen absorbable layer and the two layers adjacent to it, the amount of the particles is preferably 5 to 20 parts by weight.

Further, when these inorganic particles and organic particles or either of these particles are to be contained in the external layer, the average particle diameter (agglomerate diameter when the particles are agglomerated) of the particles is preferably 0.5 to 100 μm.

This is because when the average particle diameter of the particles is smaller than 0.5 μm, it is difficult to roughen the surface of the external layer, while when it is larger than 100 μm, a degradation in appearance occurs.

Therefore, to further improve the balance between the formability of the roughened surface and the degradation in appearance, the average particle diameter of the particles is more preferably 1 to 50 μm, much more preferably 3 to 30 μm.

The amount of the inorganic particles and organic particles is preferably 0.1 to 20 parts by weight based on 100 parts by weight of the resin constituting the external layer.

This is because when the amount of the particles is smaller than 0.1 parts by weight, it is difficult to roughen the surface of the external layer, while when it is larger than 20 parts by weight, a degradation in appearance occurs.

The above inorganic particles and organic particles or either of these particles may not have to be contained in only one of the internal layer, the oxygen absorbable layer and the external. They may be contained in a plurality of the above layers as appropriate.

(b) Blending of incompatible resin

Similarly, an incompatible resin may be blended into the resins used in the above internal layer, oxygen absorbable layer or external layer. The blending of the resins may be carried out by dry blending or melt blending. For example, an incompatible resin such as a polyvinyl alcohol resin is preferably added in an amount of 0.1 to 50 parts by weight based on 100 parts by weight of low-density polyethylene.

Thus, by blending the incompatible resin, when the internal layer, the oxygen absorbable layer or the external layer is formed, the incompatible resin is phase-separated from the resins used in these layers. By utilizing this phase separation, the surface of the oxygen absorbable laminate can be roughened easily.

When the incompatible resin is blended into the oxygen absorbable layer, the roughened surface formed on the surface of the oxygen absorbable layer is formed on the surface(s) of the internal layer and/or the external layer via its adjacent layers.

Further, when the above incompatible resin is a water-soluble resin, it is preferable to remove the incompatible resin from part or all of the surfaces by further washing the surfaces with water or an organic solvent which dissolves only the incompatible resin. By carrying out the above washing treatment, the surface(s) of the internal layer and/or the external layer can be further roughened.

(c) Embossing

It is also preferable to carry out embossing on the surface(s) of the internal layer and/or the external layer by use of a roll having pits and projections on the surface, such as an embossing roll (calendaring roll).

In this case, embossing may be carried out in an extrusion embossing device at the time of melt-extruding the above internal layer and/or the above external layer, or the surfaces of the internal layer and/or the external layer may be roughened by the embossing roll at the time of forming the above internal layer film and/or the external layer film prior to the lamination of the layers.

Further, at the time of lamination or in the form of the oxygen absorbable laminate, embossing may be carried out on the surfaces of the internal layer and/or the external layer.

The conditions for carrying out the embossing depend on the types of the thermoplastic resins used in the internal layer and the external layer, the embossed pattern on the embossing roll, and the like. In general, however, the temperature of the surface of the embossing roll is preferably 5° C. to 200° C., and the embossing rate is preferably 0.1 to 200 m/min.

(d) Lamination of layers having pits and projections on the surface

The surface(s) of the internal layer and/or the external layer may be roughened by forming other layer(s) having pits and projections formed on the surface.

That is, the surface of the oxygen absorbable laminate can be formed into a surface having a given surface roughness by laminating a layer having the roughened surface formed thereon.

The method for laminating the layer having the roughened surface formed thereon is not particularly limited. For example, by bringing a molten film into contact with a member having a roughened surface such as an embossing roll, a given roughened surface can be formed on the surface of the film and, at the same time, the film is laminated on the surface of the oxygen absorbable laminate, whereby the layer having the roughened surface formed thereon can be easily provided.

(e) Sandblasting

It is preferable to carry out sandblasting on the surface of the oxygen absorbable laminate by using a sandblasting machine after other layer is formed on the internal or external layer.

Further, the conditions for sandblasting can be selected as appropriate in consideration of the types of the thermoplastic resins used in the internal layer and the external layer, the type of sand to be used, and the like.

(f) Rubbing with abrasives

It is also preferable to roughen the surface of the oxygen absorbable laminate by rubbing the surface with an abrasive roll (including a mat roll and the like).

The conditions for rubbing depend on the types of the thermoplastic resins used in the internal layer, the external layer and the like, the type of abrasive roll to be used, and the like. In general, however, the pressing linear load is preferably 100 to 2,000 N/cm, and the rubbing rate is preferably 0.1 to 200 m/min.

[Density]

In the laminate of the present invention, the density (d1) of the ethylene resin of the internal layer and the density (d2) of the ethylene resin of the oxygen absorbable layer preferably satisfy the relationship d1>d2.

That is, by satisfying the relationship d1>d2 between the densities of the resins constituting the oxygen absorbable laminate, an improvement in the moisture retainability can be caused by the internal layer, and an improvement in the oxygen permeability can be caused by the oxygen absorbable layer. Consequently, by satisfying the relationship d1>d2, more excellent oxygen absorbability can be exerted as compared with the case where the relationship d1<d2 is satisfied, based on the same water content.

Further, the density (d1) of the ethylene resin in the internal layer is preferably 0.915 g/cm$^3$ to 0.950 g/cm$^3$.

This is because when the resin density is lower than 0.915 g/cm$^3$, the barrier properties of the internal layer which secure the water retainability of the oxygen absorbable layer lower, while when the resin density is higher than 0.950 g/cm$^3$, the permeability of oxygen to the oxygen absorbable layer lowers.

Therefore, the resin density is more preferably 0.918 g/cm$^3$ to 0.945 g/cm$^3$, much more preferably 0.920 g/cm$^3$ to 0.940 g/cm$^3$, since the balance between oxygen absorbability and water vapor permeability further improves.

[Water-vapor permeability coefficient]

A water-vapor permeability coefficient (H1) of the resin in the oxygen absorbable layer is preferably set to be higher than or equal to a water-vapor permeability coefficient (H2) of the resin in the internal layer, whereby the moisture in the oxygen absorbable layer is blocked by the internal layer.

[Oxygen permeability coefficient]

An oxygen permeability coefficient (O1) of the oxygen absorbable layer is preferably set to be higher than or equal to an oxygen permeability coefficient (O2) of the internal layer. By setting O1 to be higher than or equal to O2, the oxygen absorber absorbs oxygen quickly, thereby improving oxygen absorbability.

The oxygen absorbable laminate of the present invention is useful for preserving so-called dried foods, as exemplified by confections such as cookies, crackers, biscuits, rice crackers, candies, chocolates, dry cakes and dog biscuits; snack foods such as crisps and potato chips; powdered foods such as, powdered coffee, instant coffee, powdered milk, powdered juices and powdered soups; sea foods such as seaweeds and boiled-dried fishes; seasonings; dried noodles; dried vegetables; and tea leaves such as green tea leaves, roasted green tea leaves, oolong tea leaves and black tea leaves.

That is, since these dried foods have low water activity, it may be difficult to activate the oxygen absorber by the conventional oxygen absorbable laminate. However, in the case of the above oxygen absorbable laminate, self-activation becomes possible by use of the water contained in the laminate itself.

The oxygen absorbable laminate of the present invention is also useful for foods such as raw sweets biscuits de Savoie and the like which require quick oxygen removal for the sake of bacteriostasis. Further, in addition to these foods, it is also useful for medicaments such as infusion bags and poultices as well as cosmetics.

As for the form of a container, by forming the above oxygen absorbable laminate into the form of a bag, cup, tray, or a sealing cap used for a cap, tray or bottle, it can exert excellent storage stability to the contents.

Next, a description will be given to one embodiment of the production method of an oxygen absorbable laminate of the present invention. The present production method is a production method of an oxygen absorbable laminate which comprises the following steps (1) to (4).

A production method of an oxygen absorbable laminate comprising an internal layer, an oxygen absorbable layer and an external layer, comprising the steps of:
(1) roughening at least one surface of the above oxygen absorbable laminate,
(2) applying water to the above oxygen absorbable laminate,
(3) winding up the above oxygen absorbable laminate into a roll form immediately after the application of water, and
(4) allowing the above rolled oxygen absorbable laminate to age.

[Step of forming oxygen absorbable laminate]

It is formed, for example, by melt-kneading resin compositions in a multilayer simultaneous extruder corresponding to the internal layer, the oxygen absorbable layer and the flattening layer and extruding the molten resin compositions into predetermined shapes through multilayer multi-dies such as T-dies or circular dies.

By using the multilayer simultaneous extruder as described above, a three-layer film comprising the internal layer, the oxygen absorbable layer and the flattening layer is formed without using an adhesive or the like.

The formation of the above three-layer film is not limited by the use of the multilayer simultaneous extruder and can also be accomplished by laminating each of the layers in turn with an adhesive or the like.

Although the above description has been given by using the three-layer-coextruded film as an example, the flattening layer which is an optional constituent may be omitted to form a two-layer-coextruded film, or other resin layer may be additionally formed to form a four-layer-coextruded film.

Then, a gas barrier layer and an external layer (protective layer) are laminated on the flattening layer side of the obtained three-layer-coextruded film comprising the internal layer, the oxygen absorbable layer and the flattening layer by dry lamination or the like to form the oxygen absorbable laminate.

Alternatively, by reversing the above steps, the oxygen absorbable laminate may be formed by producing a laminate comprising the gas barrier layer and the external layer in advance and extrusion-coating the three-layer-coextruded film comprising the internal layer, the oxygen absorbable layer and the flattening layer on the gas barrier layer side of this laminate.

[Curing step]

The oxygen absorbable laminate after lamination is cured.

By producing the oxygen absorbable laminate in such a manner, the peeling of the above oxygen absorbable laminate is securely prevented in the water-application step to be described later. The conditions for curing depend on the adhesive used. In general, curing is carried out at 35 to 55° C. for 2 to 7 days.

The thus-obtained oxygen absorbable laminate may be used directly in the following step or used after slit to a predetermined width by using a shear slitter or a scoring roll.

[Surface roughening treatment]

The arithmetic average roughness (Ra) (in accordance with JIS B0601) of the surface of the oxygen absorbable laminate after a surface roughening treatment is preferably 0.4 to 20 μm.

Illustrative examples of a method for carrying out the surface roughening treatment include the aforementioned addition of inorganic and organic particles, blending of incompatible resins, embossing, lamination of layers having pits and projections, sandblasting and rubbing with abrasives. A wide variety of means may be employed as long as a predetermined rough surface can be formed on the surface of the oxygen absorbable laminate.

However, the addition of inorganic particles and organic particles or either of these particles to at least one of the internal layer, the oxygen absorbable layer and the external layer is preferable from the viewpoints of forming a controlled rough surface easily and securely and increasing the water content of the oxygen absorbable laminate securely.

[Water-application step]

This is a step in which a given amount of water is applied to the roughened surface of the oxygen absorbable laminate which has undergone the above surface roughening treatment.

A description will be given with reference to FIG. 5. This is a step in which a given amount of water is applied to the surface of the oxygen absorbable laminate which has been unrolled by using water atomizers 36 and 37 with the amount of applied water monitored by reflective infrared moisture meters 38 and 39.

Water may not have to be applied to the roughened surface side and may be applied to the smooth surface side. Further, water may be applied to not only one surface but also both surfaces.

Further, the water supplied to the water atomizers is preferably the one which is sterilized by passing through sterile filters 32 and 33 and whose amount of flow is controlled by flowmeters 34 and 35.

The application of water by means of such water atomizers is preferably carried out by such methods as spray coating, roller coating and immersion coating.

Further, the application of a mixture of water and alcohol is also preferable to increase the permeability of water to the oxygen absorbable layer.

Further, it is also preferable to subject the surface of the oxygen absorbable laminate to a corona treatment in advance in order to achieve the more uniform application of water.

The water to be applied is not limited to a liquid form and may be applied in vapor form.

In the step of applying water to the oxygen absorbable laminate, it is preferable to apply water while non-water-applied portions are created along its edges.

By applying water as described above, the formation of rust at the edges can be prevented effectively. That is, even if the oxygen absorber is exposed at the edges, the discoloration (formation of rust) by the oxidation of the oxygen absorber contained in the oxygen absorbable layer can be suppressed.

[Winding step]

This is a step in which the water-applied oxygen absorbable laminate is wound up in roll form.

A description will be given with reference to FIG. 5. This a step in which the oxygen absorbable laminate to which water has been applied in the above water-application step is wound up in roll form by winders 42 and 43 immediately after the application of water.

By winding up the laminate immediately after the application of water as described above, water can be trapped in the voids of the oxygen absorbable laminate, thereby preventing the transpiration of the water present on the surface of the oxygen absorbable laminate and allowing the laminate to uniformly contain a predetermined amount of water in the following aging step.

The conditions for winding are selected as appropriate in consideration of the physical properties, thicknesses and the like of the materials of the oxygen absorbable laminate in order to prevent the occurrences of irregular winding, telescope and the like.

Figure 5:
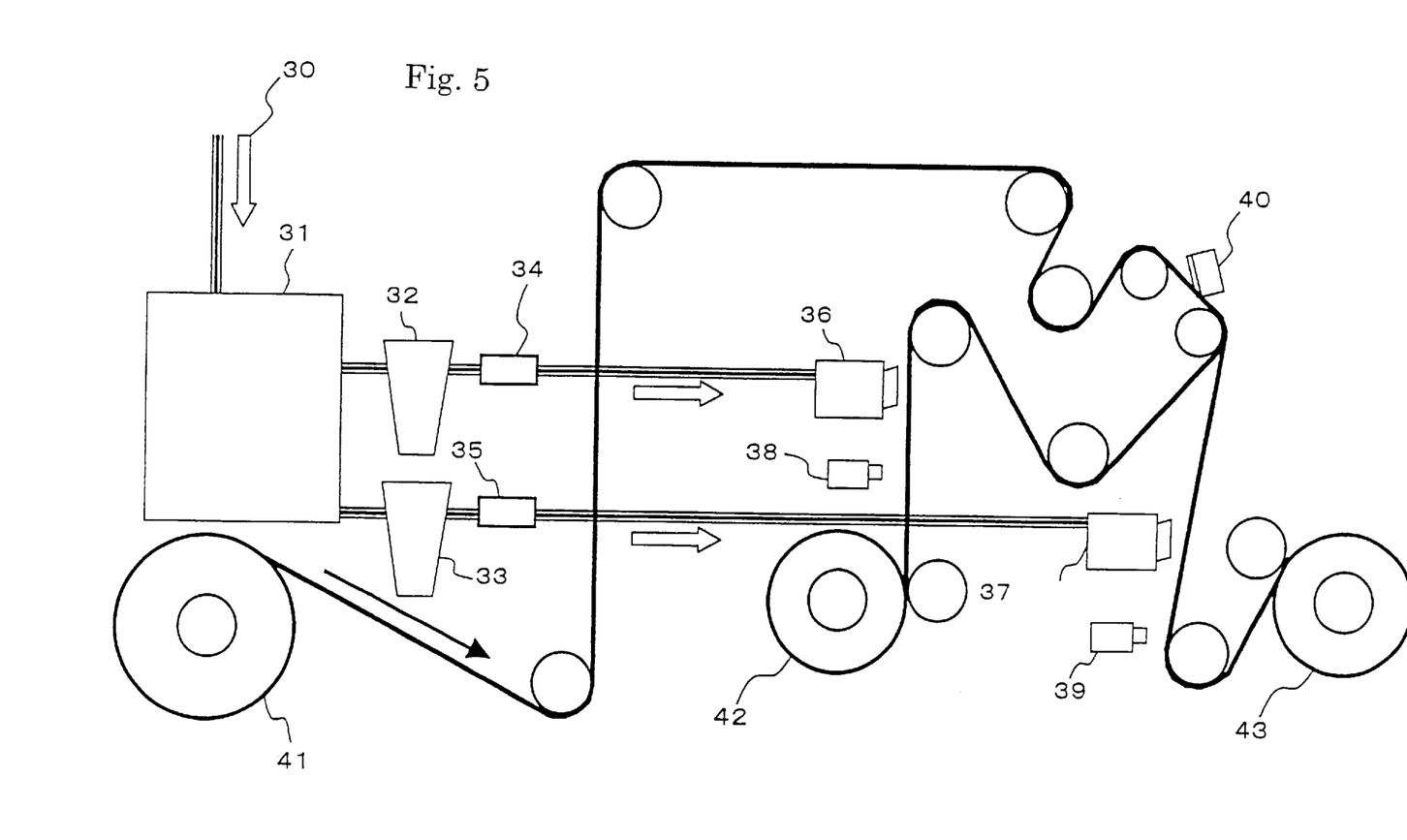
FIG. 5 is a diagram illustrating the slit step, water-application step and winding step in the process of producing the oxygen absorbable laminate.

The schematic diagram of FIG. 5 shows a line on which the aforementioned slitting, water-application and winding steps can be performed continuously.

[Aging step]

This is a step in which the water applied to the surface of the oxygen absorbable laminate is caused to be incorporated into the above oxygen absorbable laminate.

Aging is carried out in a sealed system with water present on the surface of oxygen absorbable laminate.

For example, aging is preferably carried out by sealing a roll of the oxygen absorbable laminate having water applied to the surface in a packaging bag made of a resin film or a special container having sealability.

The conditions for aging are not preferably limited as long as the water present on the surface of the oxygen absorbable laminate is incorporated into the above oxygen absorbable laminate. In general, the laminate is preferably left to stand at temperatures of not lower than 31° C. and lower than 60° C. for 15 to 400 hours after the application of water.

Aging is carried out by the diffuse permeation of water through the internal and external layer resins. The water permeated through the internal layer and/or the external layer into the oxygen absorbable layer activates the oxygen absorber.

The water content after aging is preferably 0.5 to 25 g/m$^2$.

This is because when the water content is lower than 0.5 g/m$^2$, oxygen absorbability may significantly deteriorate, while when the water content is higher than 25 g/m$^2$, the heat sealability of the internal layer deteriorates.

Therefore, the water content is more preferably 0.7 to 10 g/m$^2$, much more preferably 1 to 5 g/m$^2$.

On the surface of the oxygen absorbable laminate after the completion of aging, little or no free water is present, and the applied water is moved into the oxygen absorbable layer.

Further, the water-applied oxygen absorbable laminate is preferably aged by winding it up into a roll form and then sealing the roll with a packaging material made of polyolefins, particularly a linear low-density polyethylene of 50 to 200 μm.

This can effectively prevents the diffusion of water from the laminate. As a result, the oxygen absorber in the laminate can be maintained in an activated state, and hydrogen generated due to reaction of the oxygen absorber and water in the laminate can be effectively exhausted.

In addition, when the water-applied oxygen absorbable laminate is subjected to aging as described above, a vacuum chamber having sealability or the like can be employed.

EXAMPLES

The present invention will be further described with reference to examples.

Example 1

(1) Production of oxygen absorbable laminate
(i) Preparation of three-layer coextruded film Using a coextruded inflation film molding machine, a three-layer coextruded film comprising the internal layer, oxygen absorbable layer and flattening layer having the following constitutions was prepared. internal layer: a 20-μm-thick concealed layer comprising a composition containing 15 parts by weight of titanium oxide (titanium white) having an average particle diameter of 0.3 μm and 11 parts by weight of diatomaceous earth having an average particle diameter of 10 μm based on 100 parts by weight of LDPE. The titanium oxide and diatomaceous earth were compounded as an LDPE-based high-concentration master batch.

oxygen absorbable layer: a 25-μm-thick oxygen absorbable resin layer comprising 43 parts by weight of a composition containing reduced iron powders (average particle diameter: 25 μm) and sodium chloride in the ratio of 100:4 based on 100 parts by weight of LDPE.

flatting layer: LDPE having a thickness of 10 μm.

(ii) Lamination on the three-layer coextruded film

An aluminum foil (7 μm) was bonded to a polyethylene terephthalate film (12 μm) by a polyurethane adhesive to form a laminate. Then, after the flattening layer of the above three-layer coextruded film was subjected to a corona treatment, the aluminum foil side of the laminate is bonded to the flattening layer side of the above three-layer coextruded film by a polyurethane adhesive to form an oxygen absorbable laminate.

(iii) Curing step

The oxygen absorbable laminate obtained in roll form in the above (ii) was left to stand at 35° C. for 3 days to cure the polyurethane adhesive.

(2) Water incorporation treatment
(i) Slitting step

The cured oxygen absorbable laminate in roll form was unrolled and slit into strips having a width of 155 mm by slitter.

(ii) Water-application step

To the roughened surface of the internal layer of the oxygen absorbable laminate immediately after slitting, sterilized water was applied by a rotor dampening device (manufactured by WEKO Co., Ltd.). Further, the amount of the sterilized water was adjusted to be 1.9 g/m$^2$ by monitoring it by an infrared moisture meter.

In addition, the rotor dampening device was adjusted such that the water was applied to a width of 120 mm in the 155-mm-wide strip with 17.5-mm-wide non-water-applied portions on both sides thereof.

(iii) Winding step

The oxygen absorbable laminate immediately after the application of water was immediately wound up into a roll having an unrolled length of 1,000 m by winder.

(iv) Packaging step

The water-applied and rolled oxygen absorbable laminate was sealed in a packaging bag made of a 100-μm-thick LLDPE (linear low-density polyethylene) film.

(v) Aging step

The packaged oxygen absorbable laminate was left to stand at 35° C. for 3 days to allow the laminate to incorporate the applied water therein.

(3) Evaluation of oxygen absorbable laminate
(i) Measurement of surface roughness The arithmetic average roughness (Ra) of the internal layer in the oxygen absorbable laminate was measured by using a surface roughness measuring instrument SURFCOM (manufactured by TOKYO SEIMITSU Co., Ltd.) in accordance with JIS B0601. With a cutoff value of 0.8 mm and an evaluation length of 4 mm, the arithmetic average roughness was measured at 10 or more sites in each of MD (direction in which the film was formed) and TD (direction perpendicular to MD) directions and evaluated by the average value. As a result, it was 1.25 $\mu$m.

(ii) Measurement of water content

When the water content of the oxygen absorbable laminate in accordance with the above expression (1) was measured, it was 1.7 g/m$^2$.

(iii) Evaluation of oxygen absorbability

Using the obtained oxygen absorbable laminates, one was put on the other such that the internal layer of one was opposed to that of the other, and three sides of the laminates were heat-sealed to prepare a bag having a size of 65 mm×77.5 mm.

A green tea bag was put in this bag, and the bag was heat-sealed with a head space of 13.4 ml.

At that point, the concentration of oxygen in the head space was 20.9%.

After the bag was stored at 22° C. for a predetermined time period, the concentration of the residual oxygen in the above bag was measured by a gas chromatograph (GC-8A, product of SHIMADZU CORPORATION). The results are shown in Table 1.

(iv) Sensory evaluation

The quality of the green tea bag in the above bag which had been stored for a predetermined time period was evaluated by the sensory test involving 10 panelists. The evaluation was made by a 5-scale evaluation method with the quality of the tea bag before storage being 5 (highest point) on a scale of 1 to 5. The items to be evaluated were color, flavor and taste, and the average value of the results of evaluating these three items was taken as the overall evaluation point. The result is shown in Table 1.

Example 2

An oxygen absorbable laminate was produced, subjected to the water incorporation treatment and evaluated in the same manner as in Example 1 except that the amount of the diatomaceous earth having an average particle diameter of 10 $\mu$m in Example 1 was decreased from 11 parts by weight to 3 parts by weight and that the surface roughness Ra of the surface of the internal layer was 0.80 $\mu$m. The obtained results are shown in Table 1.

Example 3

An oxygen absorbable laminate was produced, subjected to the water incorporation treatment and evaluated in the same manner as in Example 1 except that PMMA beads (5 parts by weight) having an average particle diameter of 10 $\mu$m were used in place of the diatomaceous earth in the internal layer in Example 1. The obtained results are shown in Table 1.

Example 4

An oxygen absorbable laminate was produced, subjected to the water incorporation treatment and evaluated in the same manner as in Example 1 except that in place of using the diatomaceous earth in the internal layer in Example 1, silica (7 parts by weight) having an average particle diameter of 29 $\mu$m was added to the oxygen absorbable layer. The obtained results are shown in Table 1.

Example 5

An oxygen absorbable laminate was produced, subjected to the water incorporation treatment and evaluated in the same manner as in Example 1 except that the diatomaceous earth in the internal layer in Example 1 was not used and that a polypropylene film (20 $\mu$m) to which silica (3 parts by weight) having an average particle diameter of 4 $\mu$m had been added was used in place of a polyethylene terephthalate film (12 $\mu$m) as the external layer. The obtained results are shown in Table 1.

Example 6

An oxygen absorbable laminate was produced, subjected to the water incorporation treatment and evaluated in the same manner as in Example 1 except that in place of adding the diatomaceous earth to the internal layer in Example 1, 10 parts by weight of polyvinyl alcohol resin was added as the incompatible resin based on 100 parts by weight of the LDPE resin and that the arithmetic average roughness (Ra) of the surface of the internal layer was 0.85 $\mu$m. The obtained results are shown in Table 1.

Example 7

An oxygen absorbable laminate was produced, subjected to the water incorporation treatment and evaluated in the same manner as in Example 1 except that in place of using the diatomaceous earth in the internal layer in Example 1, 10 parts by weight of polyvinyl alcohol resin was added to the oxygen absorbable layer based on 100 parts by weight of the LDPE resin. The obtained results are shown in Table 1.

Example 8

An oxygen absorbable laminate was produced, subjected to the water incorporation treatment and evaluated in the same manner as in Example 1 except that in place of adding the diatomaceous earth to the internal layer, the three-layer coextrusion of the internal layer, the oxygen absorbable layer and the flattening layer was carried out by a T-die method and a sandblasting roll was pressed against the internal layer side of the molten film to form a roughened surface having an arithmetic average roughness (Ra) of 1.53 $\mu$m. The obtained results are shown in Table 1.

Example 9

An oxygen absorbable laminate was produced, subjected to the water incorporation treatment and evaluated in the same manner as in Example 1 except that in place of adding the diatomaceous earth to the internal layer, an LDPE resin was extrusion-laminated on the internal layer side of the laminate to a thickness of 15 $\mu$m by using a sandblasting roll as a cooling roller to form a roughened surface having an arithmetic average roughness (Ra) of 1.53 $\mu$m on the surface of the laminate. The obtained results are shown in Table 1.

Comparative Example 1

An oxygen absorbable laminate was produced, subjected to the water incorporation treatment and evaluated in the same manner as in Example 1 except that the addition of inorganic particles to the internal layer in Example 1 was not carried out and that the surface roughening treatment was not carried out. The obtained results are shown in Table 1.

Comparative Example 2

An oxygen absorbable laminate was produced and subjected to the water incorporation treatment in the same manner as in Example 1 except that a roughened surface having an arithmetic average roughness (Ra) of 25 μm was formed on the surface of the internal layer by changing the sandblasting roll used at the time of producing the three-layer coextruded film in Example 8 to an embossing roll having larger pits and projections. When it was attempted to evaluate the oxygen absorbability of this oxygen absorbable laminate by the same method as used in Example 1, many deficient sealings occurred due to the excessive sizes of the pits and projections.

Comparative Example 3

An oxygen absorbable laminate was produced, subjected to the water incorporation treatment and evaluated in the same manner as in Example 1 except that the amount of the sterilized water to be applied was adjusted to be 0.4 g/m² in the water-application step. The obtained results are shown in Table 1.

Comparative Example 4

The preparation of the three-layer coextruded film in Example 1 was carried out by a T-die method based on the following constitution, and a sandblasting roll was pressed against the internal layer side of the molten film to form a roughened surface having an arithmetic average roughness (Ra) of 19.8 μm.

internal layer: a 20-μm-thick concealed layer comprising a composition containing 15 parts by weight of titanium oxide having an average particle diameter of 0.3 μm based on 100 parts by weight of LDPE. The titanium oxide was compounded as an LDPE-based high-concentration master batch.

oxygen absorbable layer: a 25-μm-thick oxygen absorbable resin layer comprising 43 parts by weight of a composition containing reduced iron powders (average particle diameter: 25 μm) and sodium chloride in the ratio of 100:20 based on 100 parts by weight of LDPE.

flattening layer: LDPE having a thickness of 10 μm.

An oxygen absorbable laminate was produced in the same manner as in Example 1 except that a polypropylene film which had been caused to have an arithmetic average surface roughness (Ra) of 3.5 μm by the addition of silica (7 parts by weight) having an average particle diameter of 29 μm was used in this three-layer coextruded film in place of the polyethylene terephthalate film as the external layer.

The water incorporation treatment was carried out on this oxygen absorbable laminate in the same manner as in Example 1 except that the amount of the sterilized water to be applied was controlled to be 30 g/m² and that the aging time was set to be 10 days.

The water content of the oxygen absorbable laminate after aging was 27 g/m².

When it was attempted to evaluate the oxygen absorbability of this oxygen absorbable laminate by the same method as used in Example 1, many deficient sealings occurred at the time of heat-sealing due to the excessive water content.

TABLE 1

| | Surface roughening treatment | Ra (μm) | Water content (g/m²) | Concentration of residual oxygen in the bag (%) | | | Sensory test | |
|---|---|---|---|---|---|---|---|---|
| | | | | after 1 week | after 3 months | after 6 months | after 3 months | after 6 months |
| Ex. 1 | inorganic particles (internal layer) | 1.25 | 1.7 | 4.4 | 1.1 | <0.1 | 5 | 4 |
| Ex. 2 | inorganic particles (internal layer) | 0.80 | 1.4 | 6.5 | 3.2 | 0.5 | 4 | 4 |
| Ex. 3 | organic particles (internal layer) | 1.10 | 1.7 | 4.6 | 1.5 | <0.1 | 5 | 4 |
| Ex. 4 | inorganic particles (oxygen absorbable layer) | 1.63 | 1.7 | 4.4 | 1.2 | <0.1 | 5 | 4 |
| Ex. 5 | inorganic particles (external layer) | 0.75 | 1.3 | 7.0 | 3.5 | 0.7 | 4 | 3 |
| Ex. 6 | incompatible resin (internal layer) | 0.85 | 1.4 | 6.8 | 3.5 | 0.6 | 4 | 3 |
| Ex. 7 | incompatible resin (oxygen absorbable layer) | 0.80 | 1.4 | 6.7 | 3.4 | 0.6 | 4 | 4 |
| Ex. 8 | embossing (internal layer) | 1.53 | 1.7 | 4.3 | 1.0 | <0.1 | 5 | 4 |
| Ex. 9 | lamination of uneven layer | 1.53 | 1.7 | 4.2 | 1.0 | <0.1 | 5 | 4 |
| Comp. Ex. 1 | — | | 0.2 | 0.2 | 20.6 | 15.3 | 10.1 | 3 | 1 |
| Comp. Ex. 3 | inorganic particles (internal layer) | 1.25 | 0.3 | 20.6 | 14.1 | 9.0 | 3 | 1 |

Ex.: Example, Comp. Ex.: Comparative Example

Example 10

(1) Production and water incorporation treatment of oxygen absorbable laminate

Using a coextruded inflation film molding machine and a three-layer coextruded film comprising the internal layer, oxygen absorbable layer and flattening layer having the following constitutions, an oxygen absorbable laminate was produced and subject to the water incorporation treatment in the same manner as in Example 1.

internal layer: a 20-μm-thick concealed layer comprising a composition containing 15 parts by weight of titanium oxide (titanium white) having an average particle diameter of 0.3 μm and 11 parts by weight of diatomaceous earth having an average particle diameter of 10 μm based on 100 parts by weight of LLDPE having a resin density of 0.940 g/cm$^3$.

oxygen absorbable layer: a 25-μm-thick oxygen absorbable resin layer comprising 43 parts by weight of an oxygen absorber containing reduced iron powders (average particle diameter: 25 μm) and sodium chloride in the ratio of 100:4 based on 100 parts by weight of LDPE having a resin density of 0.924 g/cm$^3$.

flattening layer: LDPE having a thickness of 10 μm.

(2) Evaluation of oxygen absorbable laminate (i) Measurement of water content

The water content of the oxygen absorbable laminate in accordance with the above expression (1) was measured. The result is shown in Table 2.

(ii) Measurement of the amount of absorbed oxygen

In a gas-impermeable cup (internal volume: 87 ml), three test pieces (20 mm×150 mm each) cut out of the water-incorporated oxygen absorbable laminate and 2 ml of 95-wt % glycerine aqueous solution for adjusting the humidity in the cup to be 20%RH were placed, and the cup was heat-sealed by a heat-sealable capping material made of a gas-impermeable aluminum-foil-laminated film.

The cup was stored at 22° C. for 7 days, after which the concentration of oxygen in the container was analyzed by a gas chromatograph, and the amount of oxygen absorbed per unit film area was calculated. The result is shown in Table 2.

Example 11

An oxygen absorbable laminate was produced and evaluated in the same manner as in Example 10 except that the resin density (d1) of the internal layer was changed from 0.940 g/cm$^3$ to 0.930 g/cm$^3$ and it satisfied the relationship d1>d2. The results are shown in Table 2.

Example 12

An oxygen absorbable laminate was produced and evaluated in the same manner as in Example 10 except that the resin density (d2) of the oxygen absorbable layer was changed from 0.924 g/cm$^3$ to 0.907 g/cm$^3$ and it satisfied the relationship d1>d2. The results are shown in Table 2.

Comparative Example 5

An oxygen absorbable laminate was produced and evaluated in the same manner as in Example 10 except that the resin density (d1) of the internal layer and the resin density (d2) of the oxygen absorbable layer were set to be 0.924 g/cm$^3$, respectively, and that the relationship d1=d2 was established. The results are shown in Table 2.

Comparative Example 6

An oxygen absorbable laminate was produced and evaluated in the same manner as in Example 10 except that the resin density (d2) of the oxygen absorbable layer was changed from 0.924 g/cm$^3$ to 0.940 g/cm$^3$ and it satisfied the relationship d1<d2. The results are shown in Table 2.

Comparative Example 7

An oxygen absorbable laminate was produced and evaluated in the same manner as in Example 10 except that the resin density (d1) of the internal layer was changed from 0.940 g/cm$^3$ to 0.910 g/cm$^3$ and it satisfied the relationship d1<d2. The results are shown in Table 2.

TABLE 2

| | Density of internal layer (d1) (g/cm$^3$) | Density of oxygen absorbable layer (d2) (g/cm$^3$) | Water content (g/m$^2$) | Amount of absorbed oxygen (cm$^3$/cm$^2$) | Evaluation |
|---|---|---|---|---|---|
| Ex. 10 | 0.940 | 0.924 | 1.7 | 0.033 | ○ |
| Ex. 11 | 0.930 | 0.924 | 1.7 | 0.031 | ○ |
| Ex. 12 | 0.924 | 0.907 | 1.7 | 0.035 | ○ |
| Comp. Ex. 5 | 0.924 | 0.924 | 1.7 | 0.029 | — |
| Comp. Ex. 6 | 0.924 | 0.940 | 1.7 | 0.026 | — |
| Comp. Ex. 7 | 0.910 | 0.924 | 1.7 | 0.027 | — |

Ex.: Example,
Comp. Ex.: Comparative Example

[Evaluation method]

For the oxygen absorbable laminates of Examples and Comparative Examples, the water contents and the amounts of absorbed oxygen were measured in accordance with the aforementioned measurements of the water content and the amount of absorbed oxygen, respectively.

As a result, as for the water contents, the oxygen absorbable laminates of Examples 10 to 12 and Comparative Examples 5 to 7 had the same water content, while as for the amounts of absorbed oxygen, the oxygen absorbable laminates of Examples 10 to 12 exhibited greater and more excellent oxygen absorbability than those of Comparative Examples 5 to 7 and were marked with ○.

The present invention is based on Japanese Patent Application No. 2000-182561, No. 2000-219150, which are hereby incorporated by reference.

It is to be understood by those skilled in the art that the forgoing description relates to preferred embodiments of the invention and that various changes and modifications may be made in the invention without departing from the spirit and scope thereof. Also it is to be understood that the invention is not limited to the embodiments thereof except as defined in the appended claims.

What is claimed is:

1. An oxygen absorbable laminate comprising an internal layer, an oxygen absorbable layer and an external layer, wherein at least one surface of the oxygen absorbable laminate is roughened and subjected to a water incorporation treatment.

2. The oxygen absorbable laminate of claim 1, wherein the roughened surface has an arithmetic average roughness (Ra) (in accordance with JIS B0601) of 0.4 to 20 μm.

3. The oxygen absorbable laminate of claim 1, wherein water content of the surface subjected to the water incorporation treatment is in a range of 0.5 to 25 g/m$^2$.

4. The oxygen absorbable laminate of claim 1, wherein the roughened surface is formed by adding inorganic particles and organic particles or either of these particles to at least one of the internal layer, the oxygen absorbable layer and the external layer.

5. The oxygen absorbable laminate of claim 1, wherein a flattening layer is formed between the oxygen absorbable layer and the external layer.

6. The oxygen absorbable laminate of claim 1, wherein the internal layer and the oxygen absorbable layer are made of ethylene resins, and the relationship between resin density (d1) of the internal layer and resin density (d2) of the oxygen absorbable layer is d1>d2.

7. The oxygen absorbable laminate of claim 6, wherein the resin density (dl) of the internal layer is in a range of 0.915 g/cm$^3$ to 0.950 g/cm$^3$.

8. The oxygen absorbable laminate of claim 6, wherein a water-vapor permeability coefficient (H1) of a resin constituting the oxygen absorbable layer is higher than or equal to a water-vapor permeability coefficient (H2) of a resin constituting the internal layer.

9. The oxygen absorbable laminate of claim 6, wherein an oxygen permeability coefficient (O1) of a resin constituting the oxygen absorbable layer is higher than or equal to an oxygen permeability coefficient (O2) of a resin constituting the internal layer.

10. A production method of an oxygen absorbable laminate comprising an internal layer, an oxygen absorbable layer and an external layer, comprising the steps of:

roughening at least one surface of the oxygen absorbable laminate, applying water to the oxygen absorbable laminate, winding up the water-applied oxygen absorbable laminate into a roll form, and allowing the water-applied rolled oxygen absorbable laminate to age.

11. The method of claim 10, wherein the oxygen absorbable laminate is cured and thereafter water is applied to the oxygen absorbable laminate.

12. The method of claim 10, wherein the surface roughening step is carried out to give an arithmetic average roughness (Ra) (in accordance with JIS B0601) of 0.4 to 20 μm.

13. The method of claim 10, wherein the surface roughening step is carried out by adding inorganic particles and organic particles or either of these particles to at least one of the internal layer, the oxygen absorbable layer and the external layer.

* * * * *